(12) United States Patent
Nicolai et al.

(10) Patent No.: US 8,308,589 B2
(45) Date of Patent: Nov. 13, 2012

(54) BELT AND CHAIN DRIVE WITH KIDNEY-SHAPED TRACTION MECHANISM

(75) Inventors: Karlheinz Nicolai, Luebbrechtsen (DE); Arthur Jack Clarke, Dumfries and Galloway (GB)

(73) Assignee: The Gates Corporation, Denver, CO (US)

( * ) Notice: Subject to any disclaimer, the term of this patent is extended or adjusted under 35 U.S.C. 154(b) by 574 days.

(21) Appl. No.: 12/532,080

(22) PCT Filed: Mar. 20, 2008

(86) PCT No.: PCT/DE2008/000482
§ 371 (c)(1),
(2), (4) Date: Nov. 10, 2009

(87) PCT Pub. No.: WO2008/113340
PCT Pub. Date: Sep. 25, 2008

(65) Prior Publication Data
US 2010/0130319 A1 May 27, 2010

(30) Foreign Application Priority Data
Mar. 21, 2007 (DE) .......................... 10 2007 013 443

(51) Int. Cl.
*F16H 48/06* (2006.01)

(52) U.S. Cl. .......................... 474/154; 474/156; 474/157

(58) Field of Classification Search .................. 475/149, 475/154, 156, 157; 474/75
See application file for complete search history.

(56) References Cited

U.S. PATENT DOCUMENTS
2,168,332 A 8/1939 Fischer
(Continued)

FOREIGN PATENT DOCUMENTS
CH 167367 3/1933
(Continued)

OTHER PUBLICATIONS
International Search Report for PCT/DE2008/000482.
(Continued)

*Primary Examiner* — Sang Kim
(74) *Attorney, Agent, or Firm* — Andrew M. Calderon; Roberts Mlotkowski Safran & Cole, P.C.

(57) ABSTRACT

A belt and chain drive for vehicles or for use in drive technology with an input shaft and an output shaft supported on a frame, the input shaft and the output shaft project out of the frame, with the following features: a) gear transmissions with gear wheels, which are embodied as belt and chain drives, are located between the input shaft and the output shaft, b) all of the gear wheels are constantly in rotation during operation, c) the gear transmissions located between the input shaft and the output shaft are embodied as belt and chain drives with toothed belts as traction mechanisms and with pulleys as gear wheels, d) the traction mechanism are reinforced with aramide, Kevlar, carbon fibers or other fibrous materials, is characterized in that e) the traction mechanism is pressed into a kidney-like shape onto the pulleys by at least one component during no-load rotation, and that under the effect of load this component does not touch the traction mechanism, and f) the kidney-like shape of the traction mechanism during no-load rotation is formed by a convex curvature of the driving side and by a concave curvature of the slack side, and g) the kidney-like shape of the traction mechanisms under load is formed by a straight shape of the driving side and by an intensified concave curvature of the slack side.

45 Claims, 11 Drawing Sheets

U.S. PATENT DOCUMENTS

| | | |
|---|---|---|
| 4,158,316 A | 6/1979 | Strong |
| 4,955,247 A | 9/1990 | Marshall |
| 5,553,510 A | 9/1996 | Balhorn |
| 5,871,412 A | 2/1999 | Moser |
| 5,924,950 A | 7/1999 | Pusic |
| 6,146,296 A | 11/2000 | Apostolo |
| 6,223,613 B1 | 5/2001 | Martin |
| 6,364,797 B1 | 4/2002 | Ikusue et al. |
| 8,043,185 B2 * | 10/2011 | Nicolai ............... 475/154 |
| 2004/0066017 A1 | 4/2004 | Dratewski |
| 2004/0067804 A1 | 4/2004 | Dratewski |
| 2004/0097309 A1 | 5/2004 | Kirstein |
| 2008/0234090 A1 * | 9/2008 | Nicolai ............... 475/149 |

FOREIGN PATENT DOCUMENTS

| | | |
|---|---|---|
| DE | 202 01 787 | 7/2002 |
| DE | 103 39 207 | 6/2005 |
| WO | 98/41779 | 9/1998 |
| WO | 2007/039880 | 4/2007 |

OTHER PUBLICATIONS

A Written Opinion of the International Searching Authority for PCT/DE2008/000482.

* cited by examiner

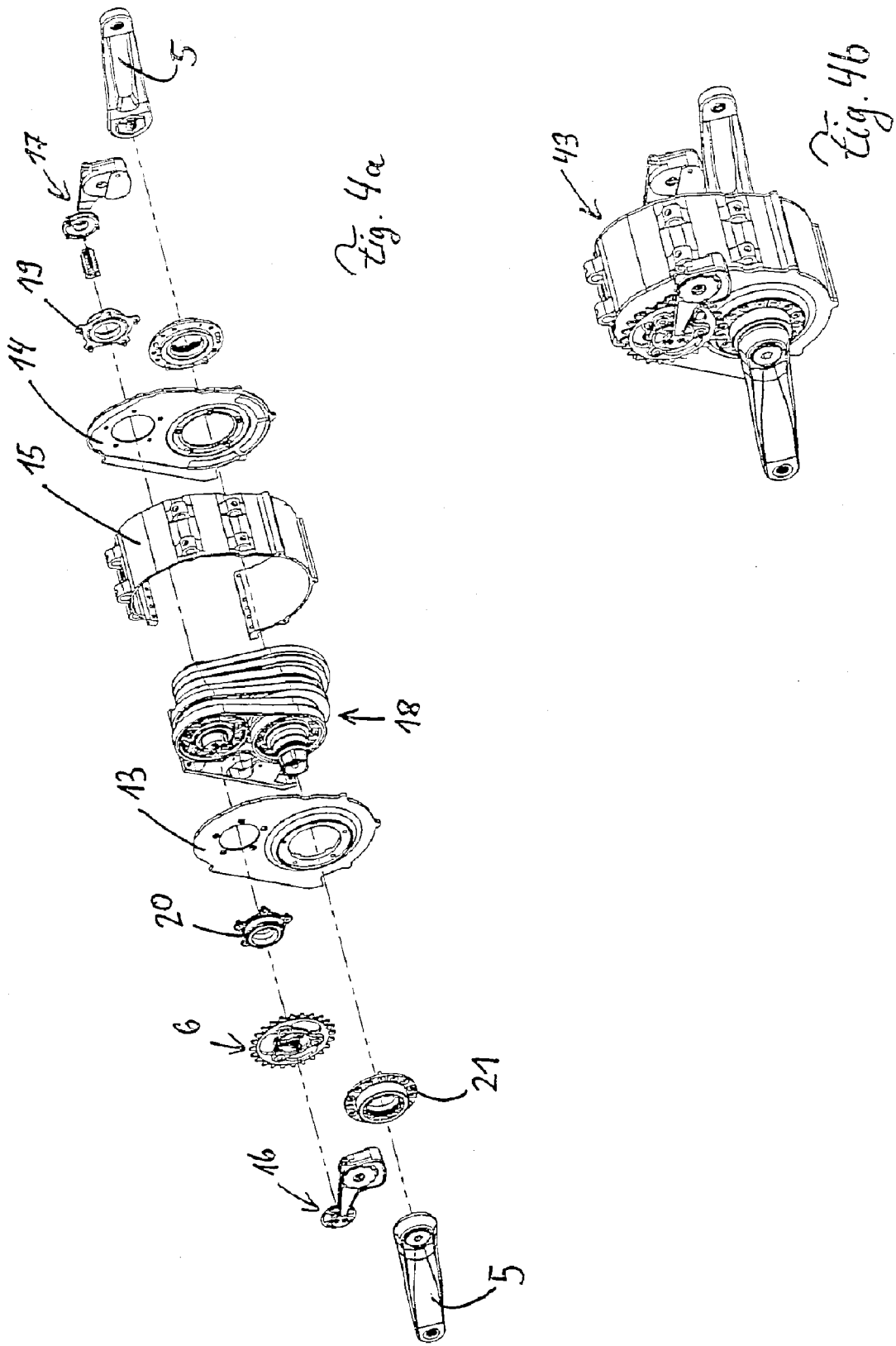

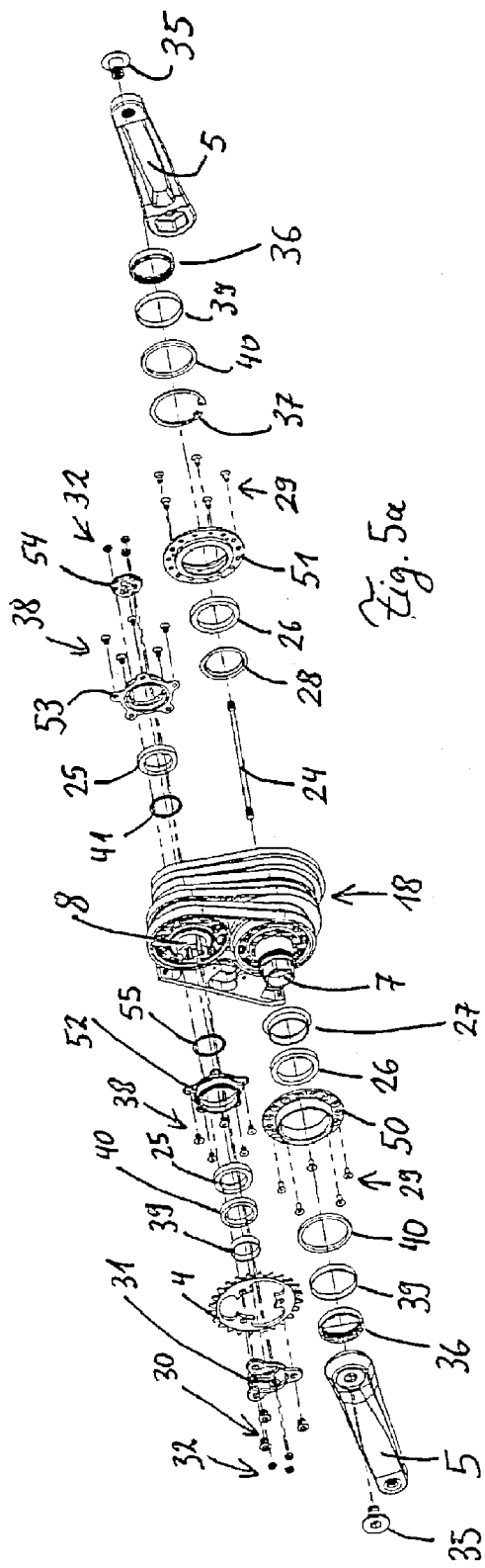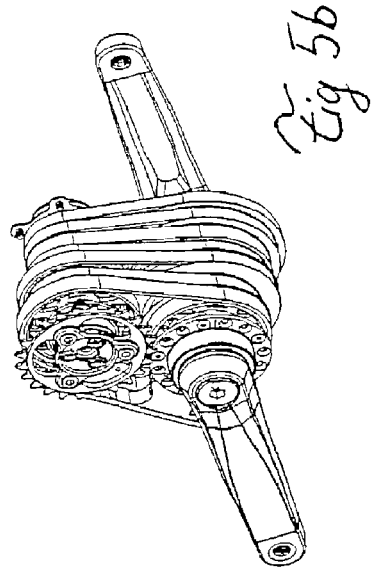

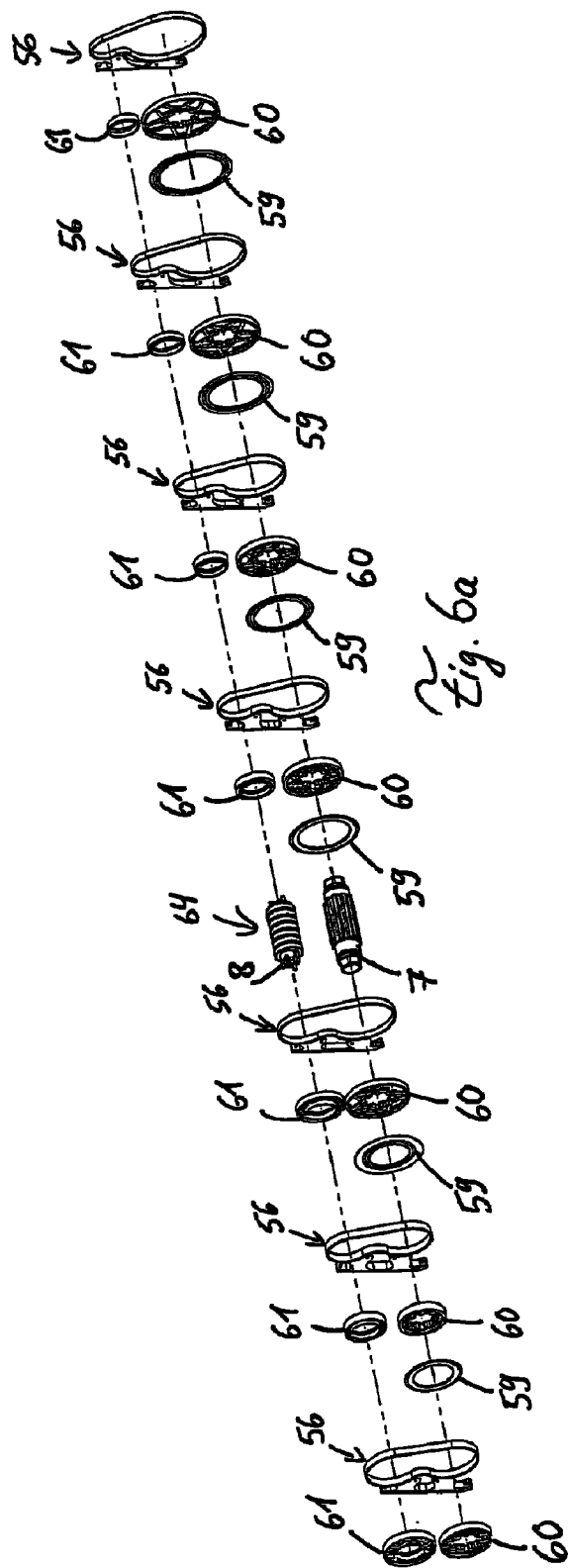
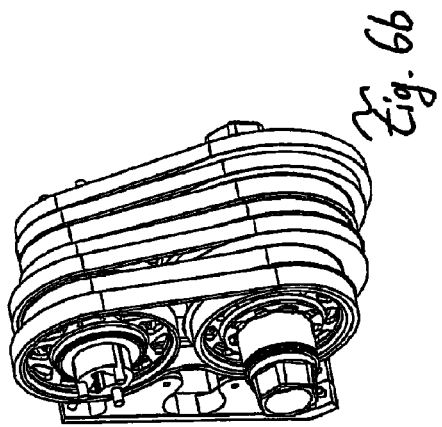
Fig. 6a
Fig. 6b

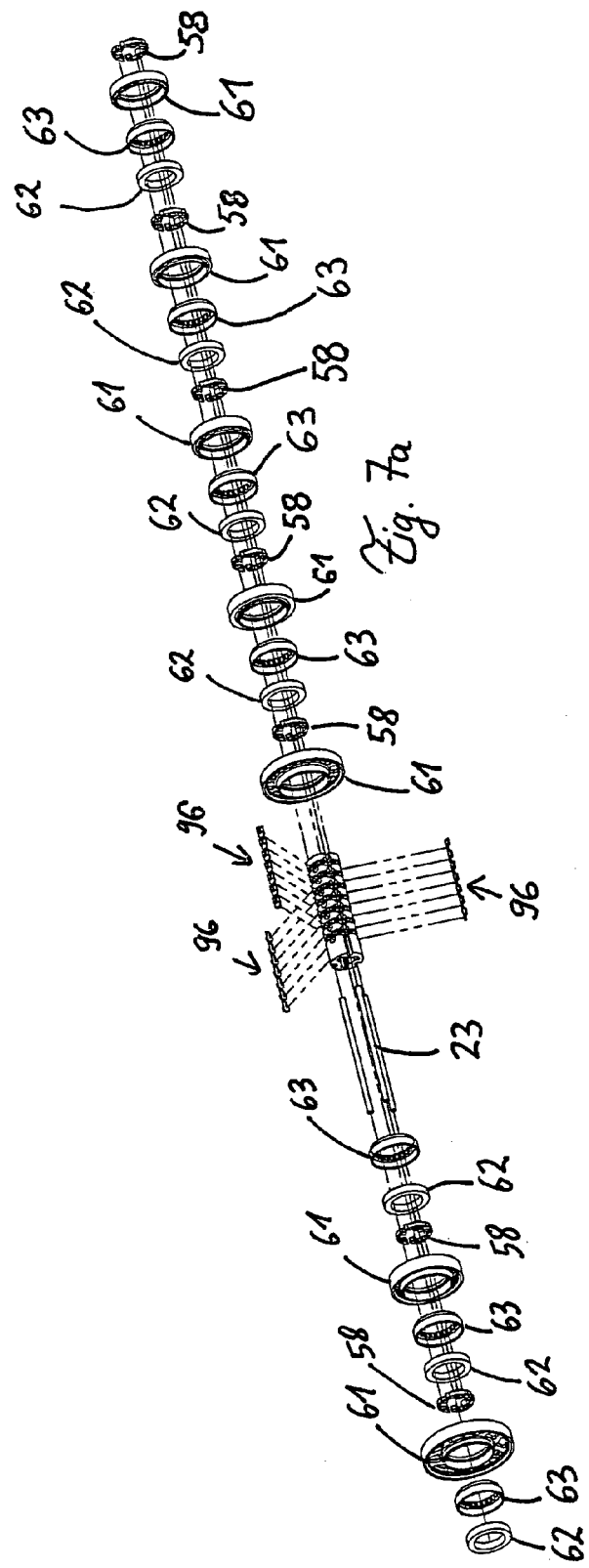
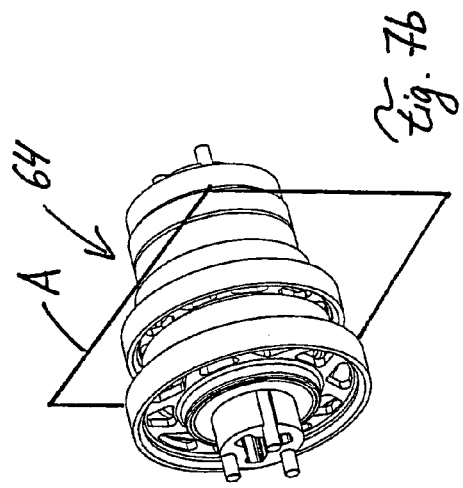

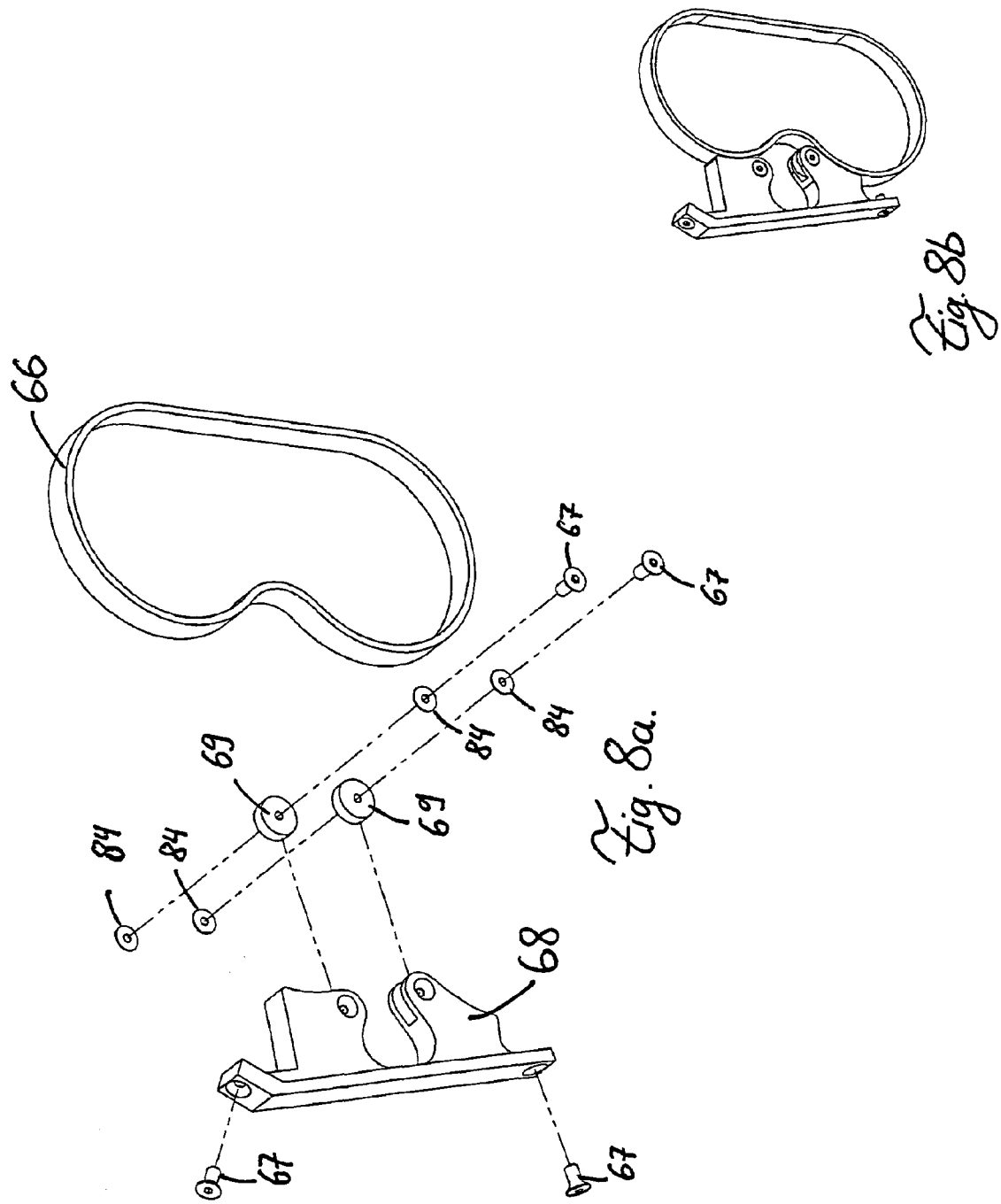

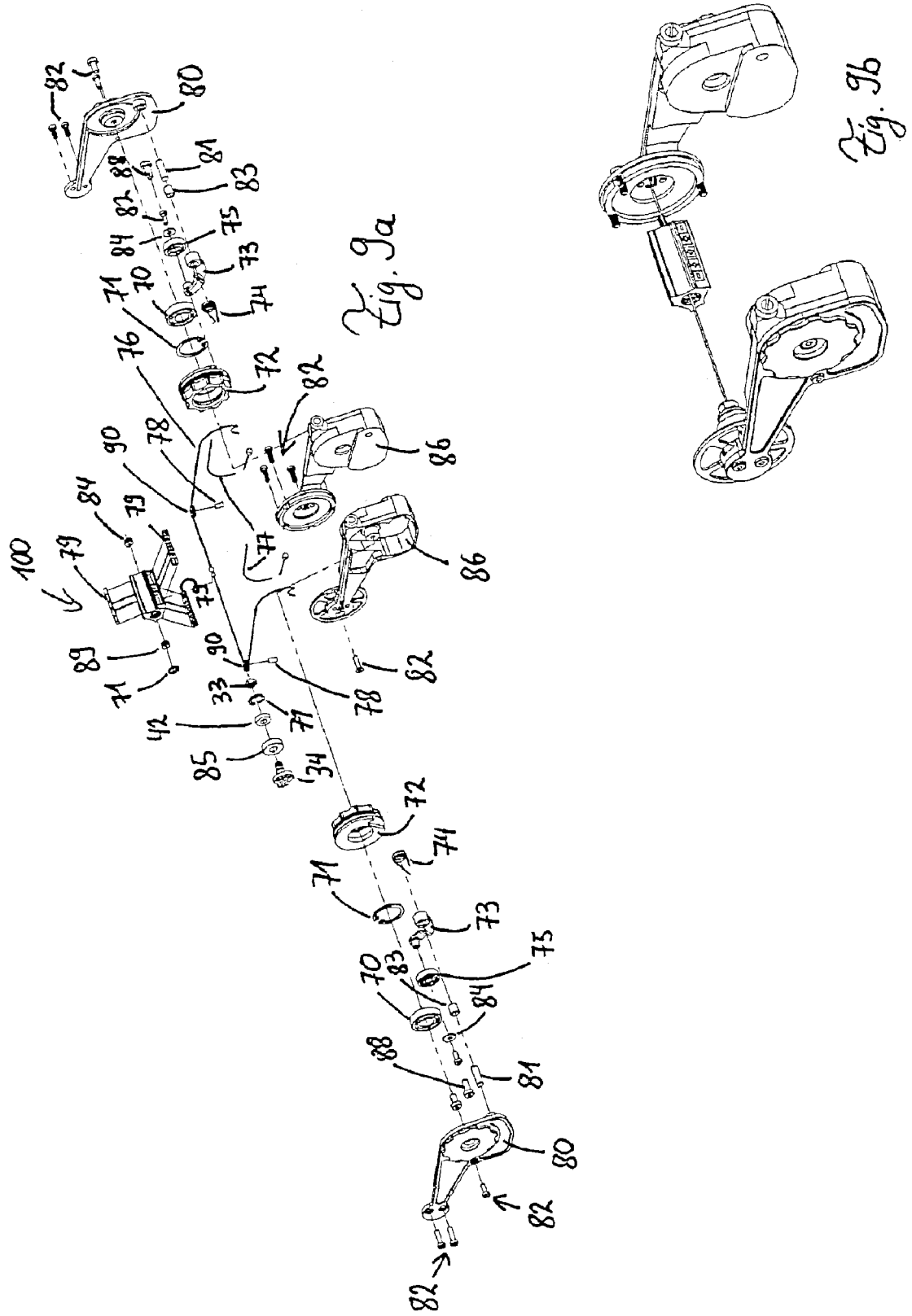

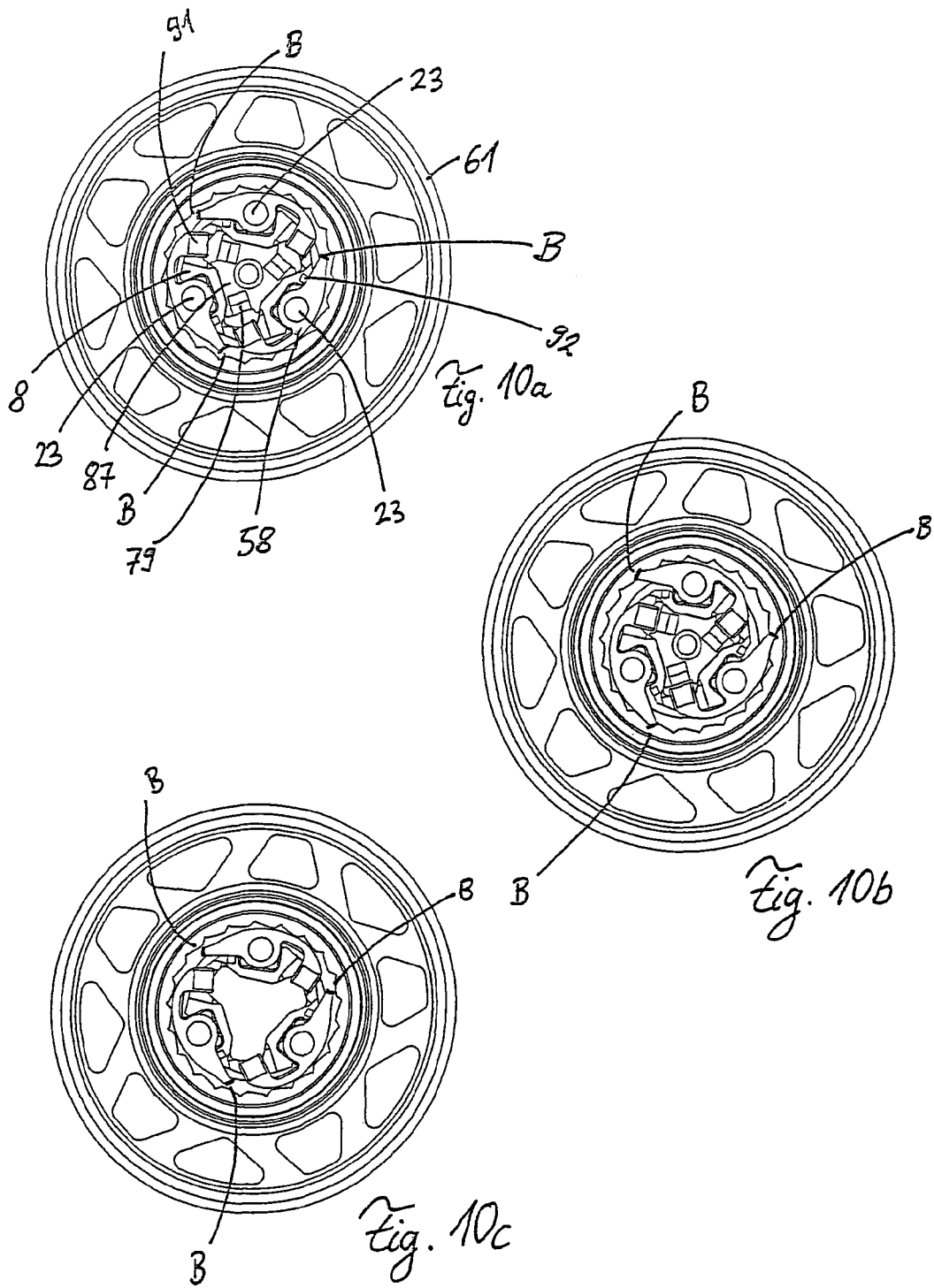

BELT AND CHAIN DRIVE WITH KIDNEY-SHAPED TRACTION MECHANISM

BACKGROUND OF THE INVENTION

1. Field of the Invention

The invention relates to a belt and chain drive for vehicles or for use in drive technology with an input shaft and an output shaft supported on a frame, the input shaft and the output shaft projecting out of the frame, with the following features:
- a) Gear transmissions with gear wheels, which are embodied belt and chain drives, are located between the input shaft and the output shaft,
- b) All of the gear wheels are constantly in rotation during operation,
- c) The gear transmissions located between the input shaft and the output shaft are embodied as belt and chain drives with toothed belts as traction means and with pulleys as gear wheels,
- d) The traction means are reinforced with aramide, Kevlar, carbon fibers or other fibrous materials.

2. Discussion of Background Information and Invention

The field of motorized vehicles has been unimaginable without manual transmissions for the past 100 years. They are also used in numerous machines in drive technology. These are very often gear constructions that work with the aid of gear wheels as spur gear transmissions or epicyclic gearing (planetary transmissions). However, the production engineering of these transmissions is generally very complex and expensive. Since these power-transmitting transmission components are generally made from steel, weight is increasingly the focus of criticism at the moment and should be considered a disadvantage. Lighter transmissions would reduce energy consumption, for example. The invention described below can be used in all conceivable product branches and is excellently suitable for use in vehicles particularly with respect to the low weight, since fiber-reinforced plastics are used as power-transmitting components. Ground vehicles, aircraft and watercraft, which can be equipped with internal combustion engines, electric motors or also other units, are to be considered by way of example here. Use is also conceivable in human powered vehicles. In order to ensure easy propulsion, the vehicles must be extraordinarily light. The functional description of the transmission is to be provided based on the example of a bicycle for this reason.

Over the past forty years, the chain drive with a shifting method on the rear axle has gained acceptance in bicycles. To this end, a rotatable bottom bracket with one or several chain wheels is mounted on the frame, which forms the load-bearing component of the bicycle with all of its mounting points for the front fork, the seat post and the rear wheel. A cassette comprising up to ten pinion gears of different sizes is located on the hub of the rear wheel. A derailleur is mounted on a fork end, which is located directly on the rear axle, the function of which derailleur is to guide the chain on the pinion gears of the cassette and to make it possible to shift gears. Through a front derailleur located generally on the seat tube it is possible to change between the different chain wheels on the bottom bracket.

Due to the shifting capability, the rider can adapt the transmission of his drive to the respective riding situation. Bicycles with a shifting system as described above are generally referred to as bicycles with derailleur gears.

Since the components are mounted outside on the frame for structural reasons in the case of a bicycle with derailleur gears, they are exposed to environmental influences to a particularly high degree. For example, dirt and water reach the derailleur, chain, cassette and other components unhindered. This means that the initially very high efficiency of a derailleur gear is drastically reduced, so that a substantial part of the force has to be expended to overcome the resistances inside the transmission. In order to guarantee the function it is necessary for the components of the derailleur gear to be regularly maintained; this includes cleaning and oiling the components as well as meticulous adjustment. This can be easily changed, for example, during collisions or contact with objects (stones, branches, etc.). Since even with the most intensive maintenance the smallest dirt particles are retained in the transmission and in particular in the bearings, some parts have to be regularly replaced. In particular the parts subject to wear, such as chain wheels and chain, call for annual replacement, which is again associated with additional expense.

Shifting in the derailleur gear is possible only when the pinion gears are rotating, since otherwise the chain cannot be changed. It must therefore be considered to be a further disadvantage that shifting at a standstill is impossible due to the structural design.

Furthermore, components can be damaged or torn off the frame during a collision or by contact with stones or branches. The listed circumstances have to be considered to be a disadvantage of derailleur gears.

As an alternative to "derailleur gear" the so-called "integral rear hub" was developed in which the shifting takes place in a transmission in the rear wheel hub. The parts derailleur, front derailleur and cassette, which are required with a derailleur gear are thus omitted. Bicycles of this type are generally referred to as bicycles with integral rear hub. An integral rear hub thus avoids the disadvantages of a derailleur gear. However, the weight of the rear wheel is increased due to the transmission integrated into the rear wheel hub. An increase in the mass on the rear wheel is very noticeable in particular in the case of so-called mountain bikes, which are ridden off-road. This applies above all to those with rear wheel suspension. The ratio of sprung to unsprung mass is of decisive importance for the riding behavior of a sprung wheel. The greater the unsprung mass in relation to the sprung mass, the more critical the riding behavior of the wheel. Impacts caused by unevenness in the road surface cannot be optimally absorbed by the chassis with high unsprung mass (heavy rear wheel).

With a known bicycle (cf. DE 103 39 207) the transmission is located inside the bicycle frame. The bottom bracket housing of the classic bicycle frame is omitted and is replaced by the gear housing. This is a common housing for gears and bottom bracket. Similar to bicycles with speed hub, the force with gearwheels is transferred via a chain or a toothed belt to the rear wheel. The chain and the rear hub do not have a shifting function in this system. The rear hub can thus be constructed to be very light, which results in a more effective rear wheel suspension. In addition, the center of gravity is located in the center of the wheel, directly under the rider. A more agile and controlled riding behavior is the result. Furthermore, the so-called "platform strategy" can be used with the aid of the transmission integrated in the frame. It has hitherto been usual in bicycle design to first construct a frame and then to equip it with the components afterwards, but now with the concept of the transmission integrated in the frame it is possible for the first time to use the platform strategy from car manufacturing in bicycle production. For example, components such as gearshift, suspension, the entire drive train as well as brakes, generator and lighting can be firmly attached in the gear housing as a platform. The customer-specific parts that complete the bicycle according to the customer or manufacturer requirements are then mounted on the transmission thus equipped. The transmission according to DE 103 39 207 comprises a planetary transmission and a primary drive. The primary drive is necessary because the planetary transmission developed for use in a speed hub cannot withstand the high moments acting in the bottom bracket. The planetary transmission is brought to a higher speed by the primary drive in order to withstand the acting forces. However, the efficiency of the drive is reduced due to this construction. This must be considered a disadvantage compared to the invention. Similar transmissions are likewise known, for example, from: U.S. Pat. Nos. 5,553,510, 4,955,247, 5,924,950, DE 20 201 787 U1, WO 2006/039880 A1, US 2004/0067804 A1 and US 2004/0066017 A1. Their structure is generally very heavy and complex. The invention provides a light and very simply structured solution for the referenced transmission type. All of these transmissions produce different speed changes between two parallel shafts. Usually one of the shafts is the drive shaft and another shaft is the driven shaft hereby. The drive shaft is also referred to below as the input shaft. The driven shaft is also referred to below as the output shaft. Wherever just the term shaft is used below, this means the input or the output shaft.

The invention thus improves multiple gears with input shaft and output shaft, wherein the input shaft is embodied to absorb the input torque and the output shaft generally projects from the gear housing and is embodied at this end to transfer the torque to the wheels of the vehicle. For example, belt wheels are mounted parallel on the input shaft and the output shaft in the housing and connected in pairs to traction means. With the aid of a gear mechanism, the belt wheels can be coupled to the output shaft. The vehicle can be a bicycle, for example, wherein the input shaft is embodied there to receive cranks and projects at both ends from the gear housing. The output shaft has on its end a pinion gear for torque transmission to the rear wheel. The vehicle can also be a motorcycle, in which the transmission is advantageously located behind the crankcase. The input shaft is connected to the crankshaft in a suitable manner. The output shaft transmits the torque through a further machine element (for example, chain, toothed belt, cardan) to the rear wheel. Use in a motor vehicle in an advantageous manner is also conceivable.

A belt and chain drive of this type is known, for example, from U.S. Pat. No. 4,158,318. In the case of this transmission, several sprockets with different diameters are rotatably mounted on the axle. The sprockets can be connected to the shaft by a coupling in a rotatably fixed manner and thus transmit a torque. The disadvantage of this invention lies on the one hand in the high weight, in particular through the use of a steel chain, on the other hand in the large space needed, the complexity of the couplings and the coupling selector.

A similar belt and chain drive is known, for example, from US 2004/0067804 A1 and US 2004/0066017 A1. With these bicycle transmissions different belt wheels are mounted on the drive shaft and the driven shaft, which are connected in pairs to traction means. Different speed ratios are achieved in that a shifting component is axially displaced inside the driven shaft with the aid of a cable. A connection element on the shifting component couples into the desired belt wheel and produces a rotationally fixed connection between driven shaft and belt wheel. However, the design described has disadvantages, which are explained in more detail below.

Both patents disclose in their main claim that the belt wheels are integrated next to one another such that they form the shape of a conical envelope. The shape of a conical envelope is formed when the diameter of the belt wheels increases from small to large on the shaft. It is precisely this peculiarity of US 2004/0067804 A1 and US 2004/0066017 A1 that is to be considered a disadvantage:

Transmissions on bicycles should increase speed in the range of 0.7-4.0. If the size of the chain wheels and their number of teeth is considered in US 2004/0067804 A1 and US 2004/0066017 A1, this speed change range can be achieved only with difficulty compared to the invention. Furthermore, when considered in terms of sports biology, only gear transitions that account for less than 15% can be handled well by the human organism.

The so-called secondary transmission is formed by two further belt wheels, which transmit the torque from the gears to the rear wheel. It is advantageous if these belt wheels do not through their proportions impair the function of the cranks and the rear wheel hub. The design according to US 2004/0067804 A1 and US 2004/0066017 A1 would be very large and voluminous in construction if the basic conditions in terms of secondary transmission, total transmission and gear transition are to be achieved. The invention is much smaller in construction compared to the cited structures.

Belt and chain drives generally have a discrete axial distance, which depends exclusively on the pitch and the length of the traction means and the diameter or number of teeth of the belt wheels used.

This axial distance can be described by the following formula:

$$a = p\left/4\left[X - (z_1 + z_2)/2 + \sqrt{[X - (z_1 + z_2)/2]^2 - 8[(z_2 - z_1)/(2\pi)]^2}\right]\right.$$

a=axial distance
p=chain pitch of the chain
X=number of links in the chain
$z_1$=number of teeth of the small chain wheel
$z_2$=number of teeth of the large chain wheel If this formula is applied to US 2004/0067804 A1 and US 2004/0066017 A1, it is found that not each individual belt wheel has the correct axial distance. A design according to US 2004/0067804 A1 and US 2004/0066017 A1 is thus disadvantageous, since some chains are taut and others are too loose. This must be considered a major disadvantage compared to the invention, since incorrectly tensioned traction means have too high a wear.

This advantage is described below as "only discrete axial distances possible." Also in U.S. Pat. No. 4,158,316 only discrete axial distances are possible due to the traction means used. This must also be considered as a disadvantage. In addition, it should be noted that this disadvantage of discrete axial distances also applies to gear trains.

Another major disadvantage can be found in U.S. Pat. No. 4,158,316, US 2004/0067804 A1 and US 2004/066017 A1 inside the gear mechanism. If a gear change is to be performed, first a belt wheel is uncoupled from the driven shaft and only thereafter is a further belt wheel coupled into the shaft. The result is that with these drives a constant rotationally fixed connection between the shaft and a gear wheel is not ensured. A neutral position can occur during a gear change. For the cyclist this means suddenly "pedaling into nothing." Injuries, particularly in the knee area, can thus occur. The invention is structured such that idling cannot occur between the individual gears during the gear change. This must be considered a major advantage.

In the past, belt and chain drives with traction means running in a parallel manner have repeatedly been encountered in which the belt wheels are coupled into an axle (see also CH 167367, U.S. Pat. No. 6,146,296 and U.S. Pat. No. 5,871, 412). However, all of these constructions have the disadvantage that a small time window with an idle could occur between two coupled-in speed changes. In particular under load it cannot be ensured that during this time window a short belt slip could occur. Likewise, a belt slip of this type leads to enormous wear on the couplings. In the long term, damage cannot be ruled out under some circumstances. The invention has the advantage that a torque-transmitting component is always engaged between two gears during the gear change.

In summary, many transmissions according to the prior art have problems with respect to weight, production costs, shifting capability under load, idling and shifting capability at a standstill.

SUMMARY OF THE INVENTION

Based on this problem, the multiple-gear transmission described at the outset is to be improved.

To solve the problem, a generic multiple-gear transmission is characterized in that
- e) at least one component inside the coupling means has the properties of a permanent magnet with a magnetic north pole and south pole, and
- f) the state of the coupling means changes through the change of an additional magnetic field inside or in the immediate vicinity of the coupling means, and
- g) during at least one shifting operation the state of at least two coupling means changes simultaneously, and
- h) at least one coupling means can transmit only torques in one direction of rotation.

Because at least one component inside the coupling means has the properties of a permanent magnet with a magnetic north pole and south pole and the state of the coupling means changes through the change of an additional magnetic field inside or in the immediate vicinity of the coupling means and during at least one shifting operation the state of at least two coupling means changes simultaneously and at least one coupling means can transmit only torques in one direction of rotation, the possibility is ruled out that through a shifting error shifting is inadvertently made into an idle position of the transmission, whereby damage to the transmission and possibly injuries to a cyclist could occur. Since only magnetic fields are changed for a gear change, shifting changes are possible under load as well as at a standstill.

If at least one component adopts a position at a distance relative to a toothing of a coupling means after two identically polarized magnetic fields have moved towards one another, it can be ensured that the shifting forces are reduced compared to the prior art.

Since the positive coupling means is formed by freewheel teeth that can engage in a toothing, the overall design can be kept very simple.

A very space-saving design results when the toothing is embodied inside the coupling means as an internal toothing.

Preferably, the freewheel teeth are arranged symmetrically to the toothing inside the coupling means in order to transmit the forces uniformly.

If the freewheel teeth are tiltably mounted on steel axes inside the shaft on which the coupling means is located, the torque is transmitted in an advantageous manner.

Low production costs are achieved among other things when at least one coupling means is formed by joining a permanent magnet and a steel component. The same advantage results when the permanent magnets that are axially displaced are inserted into a spool valve component for this purpose.

An advantageous selection of the transmission is realized when the change of the magnetic field is achieved by axial displacement of permanent magnets along the rotational axis of the shaft on which the coupling means is located.

Excess weight is avoided when the axial displacement of permanent magnets is carried out inside a hollow driven shaft.

Transmissions without access to the interior of the shafts for reasons of space can also be designed according to the invention if the axial displacement of the permanent magnets is carried out outside the input shaft.

Low production costs are achieved among other things when the permanent magnets that are axially displaced are inserted into a spool valve component for this purpose.

Preferably the permanent magnets are inserted into the spool valve component with different polarity so that the production costs can be kept low through the use of many identical parts.

An advantageously simple gear mechanism results when a bearing is located inside the spool valve component in order to transmit the shifting signal from a rotating to a stationary component.

A very cost-effective solution for the axial movement of the spool valve component is achieved when the spool valve component is connected to a traction means.

Preferably, the spool valve component adopts click-stop positions within its axial movement with respect to the shaft in order to change the magnetic field in a reproducibly identical manner inside or in the immediate vicinity of the coupling means. Shifting precision is hereby improved.

Trouble-free operation in the event of vibrations from outside is achieved if a tilted position of the freewheel tooth on the steel axle is held by a permanent magnet.

The mounting of this permanent magnet is particularly simple when the permanent magnet is inserted into the shaft on which the coupling means is located.

The necessary shifting forces are kept low when the positive rotationally fixed connection between shaft and gear wheel can be neutralized with the aid of the energy that was stored prior to the decoupling in the magnetic field.

A complete electronic selection of the state of the coupling means can be achieved if the change of an additional magnetic field is carried out inside or in the immediate vicinity of the coupling means by electromagnets. This can be advantageous in some areas of application of the transmission.

The transmission is protected from outside soiling if the frame of the transmission is embodied as a closed housing.

The dead weight is substantially reduced when the gear transmissions located between the input shaft and the output shaft are embodied as belt and chain drives with toothed belts as traction means and with pulleys as gear wheels.

Particularly high power and torques can be transmitted when the traction means are reinforced with aramide, Kevlar or carbon fiber materials.

A particularly low wear on the traction means is obtained if the fibrous materials of the toothed belts are covered with polyurethane.

Low friction is obtained if the traction means is pressed into a kidney-like shape onto the pulleys by at least one component during no-load rotation, and that under the effect of load this component does not touch the traction means. In addition, it is optimal if the kidney-like shape of the traction means during no-load rotation is formed by a convex curvature of the driving side and by a concave curvature of the slack side.

The jumping of the toothed belt on the pulleys can be achieved in an advantageous manner if the kidney-like shape of the traction means under load is formed by a straight shape of the driving side and by an intensified concave curvature of the slack side.

In addition, the friction of the toothed belts can be reduced if the traction means change their belt tension during the shifting operation.

More security is achieved against the toothed belt jumping on the pulleys if the traction means change their chain wrap-around on the belt wheel during the shifting operation.

The friction can be additionally reduced if at least one component that presses the traction means into a kidney-shaped form is embodied as a roller.

If additional guides are arranged on the slack side in a contactless manner in the immediate vicinity of the toothed belts, which guides are shaped in a similar manner to the outer contour of the toothed belt, in this manner more security is achieved against the toothed belt jumping on the pulleys in the case of load impacts and disturbances from outside, without additionally increasing the friction.

Reference is made to patent application DE 10 2007 013 443.8 in full.

BRIEF DESCRIPTION OF THE DRAWINGS

Exemplary Embodiment:

Exemplary embodiments of the invention are explained in more detail below with the aid of the following drawings, which show:

FIG. 4a shows the belt and chain drive in exploded view;

FIG. 4b shows the belt and chain drive in perspective representation;

FIG. 5a shows the belt and chain drive without gear mechanism, housing, traction means and pulleys;

FIG. 5b shows the belt and chain drive without gear mechanism, housing, traction means and pulleys in exploded view;

FIG. 6a shows a design of the driven shaft assembly in exploded view;

FIG. 6b shows a design of the driven shaft assembly in perspective view;

FIG. 7a shows a design of the pulleys on drive shaft and driven shaft in exploded view;

FIG. 7b shows a design of the pulleys on drive shaft and driven shaft in perspective view;

FIG. 8a shows a traction mechanism assembly in exploded view;

FIG. 8b shows a traction mechanism assembly in perspective view;

FIG. 9a shows a gearshift in exploded view;

FIG. 9b shows a gearshift in perspective view;

FIG. 10a shows a shifting operation in the interior of the driven shaft—$1^{st}$ position;

FIG. 10b shows a shifting operation in the interior of the driven shaft—$2^{nd}$ position;

FIG. 10c shows a shifting operation in the interior of the driven shaft—$3^{rd}$ position;

DETAILED DESCRIPTION OF THE PRESENT INVENTION

The embodiment described below uses a belt and chain drive as gears by way of example. However, the mechanisms described can also be used for a gear train.

Figure 1:
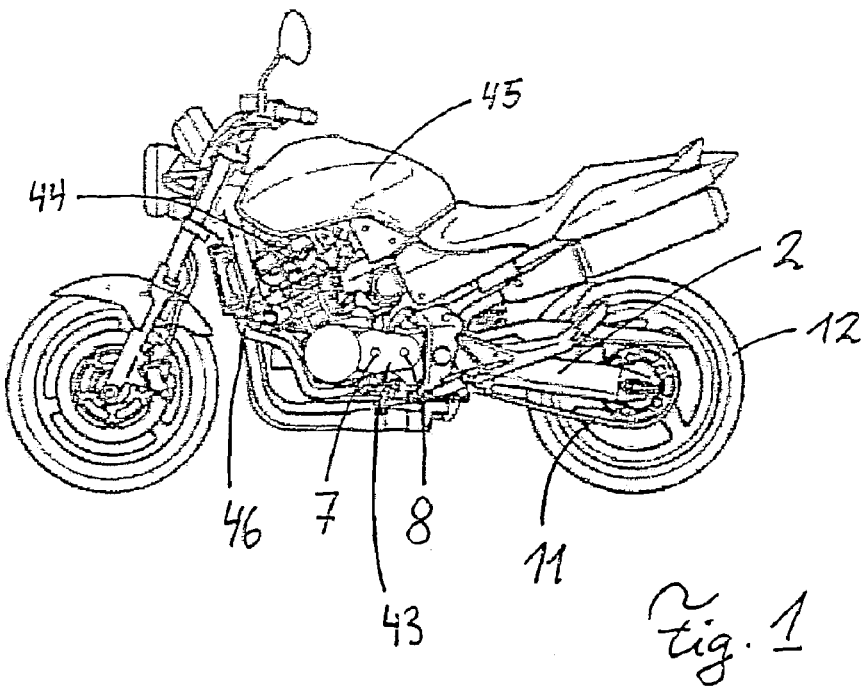
FIG. 1 shows a motorcycle in side view and with the belt and chain drive integrated into the frame.

FIG. 1 shows a motorcycle with the transmission according to the invention in side view. The internal combustion engine 44 is discernible in the classic position installed below the tank 45 and enclosed by a tubular frame 46. The link fork 2 is supported on the tubular frame 46. The rear wheel 12 is located at the end of the link fork 2. All of the usual parts of a motorcycle are discernible in the sketch, but they will not be dealt with in any further detail. The transmission according to the invention inside the gear housing 43 is located behind the crankshaft in the direction of travel. The input shaft 7 is connected to the crankshaft lying parallel by a primary drive (not shown). The output shaft 8 has a driven pinion gear 4 (not shown), which transmits the torque to the rear wheel 12 via the chain 11.

Figure 2:
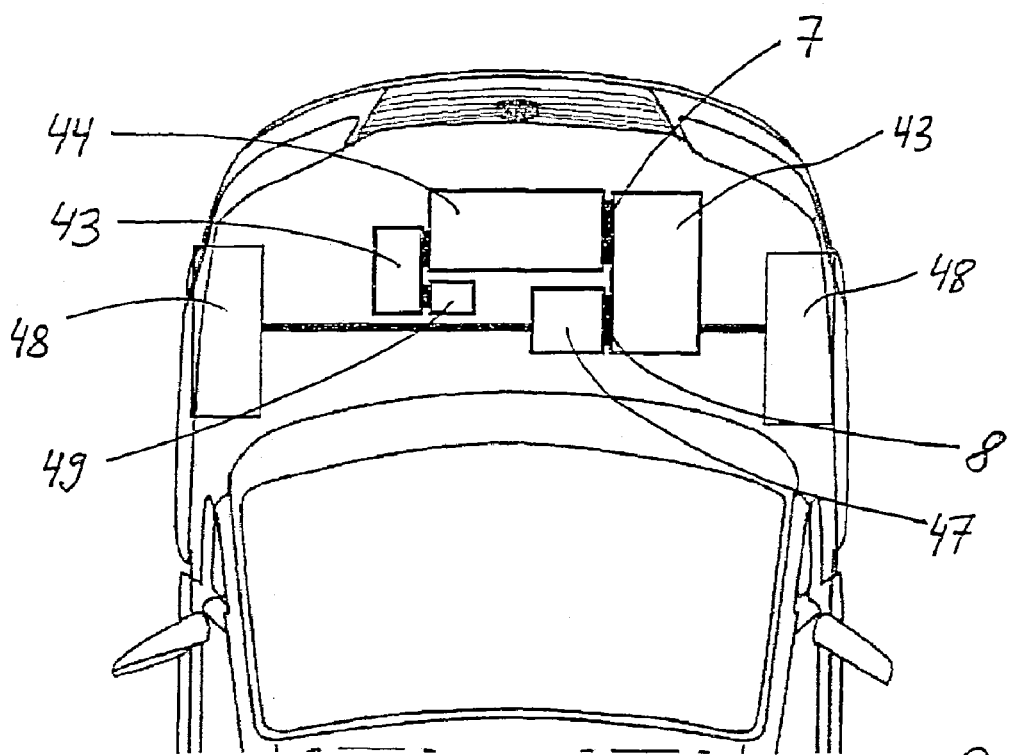
FIG. 2 shows a motor vehicle in side view and with the belt and chain drive integrated into the frame.

FIG. 2 shows the implementation of the invention inside a motor vehicle. The drive components are shown diagrammatically. In the view from above there is a classic engine 44 installed transversely to the direction of travel. The transmission according to the invention inside the gear housing 43 is connected with the input shaft 7 directly to the crankshaft. The output shaft 8 transmits the torque to a differential 47. Both of the front wheels 48 are driven from here. Ancillary components 49 such as generator, hydraulic pump for power-assisted steering, cooling fans and the like can also be operated via the belt and chain drive according to the invention. In the past it has been difficult to implement these areas of application as manual transmissions, since suitable traction means were not available. Through the introduction of new traction means, in particular through the introduction of new toothed belts, it is now possible to produce transmissions with a power-to-weight ratio which are equal to or even superior to the spur gear transmission or planetary transmission made of steel. A detailed technical design is shown below based on a bicycle.

Figure 3:
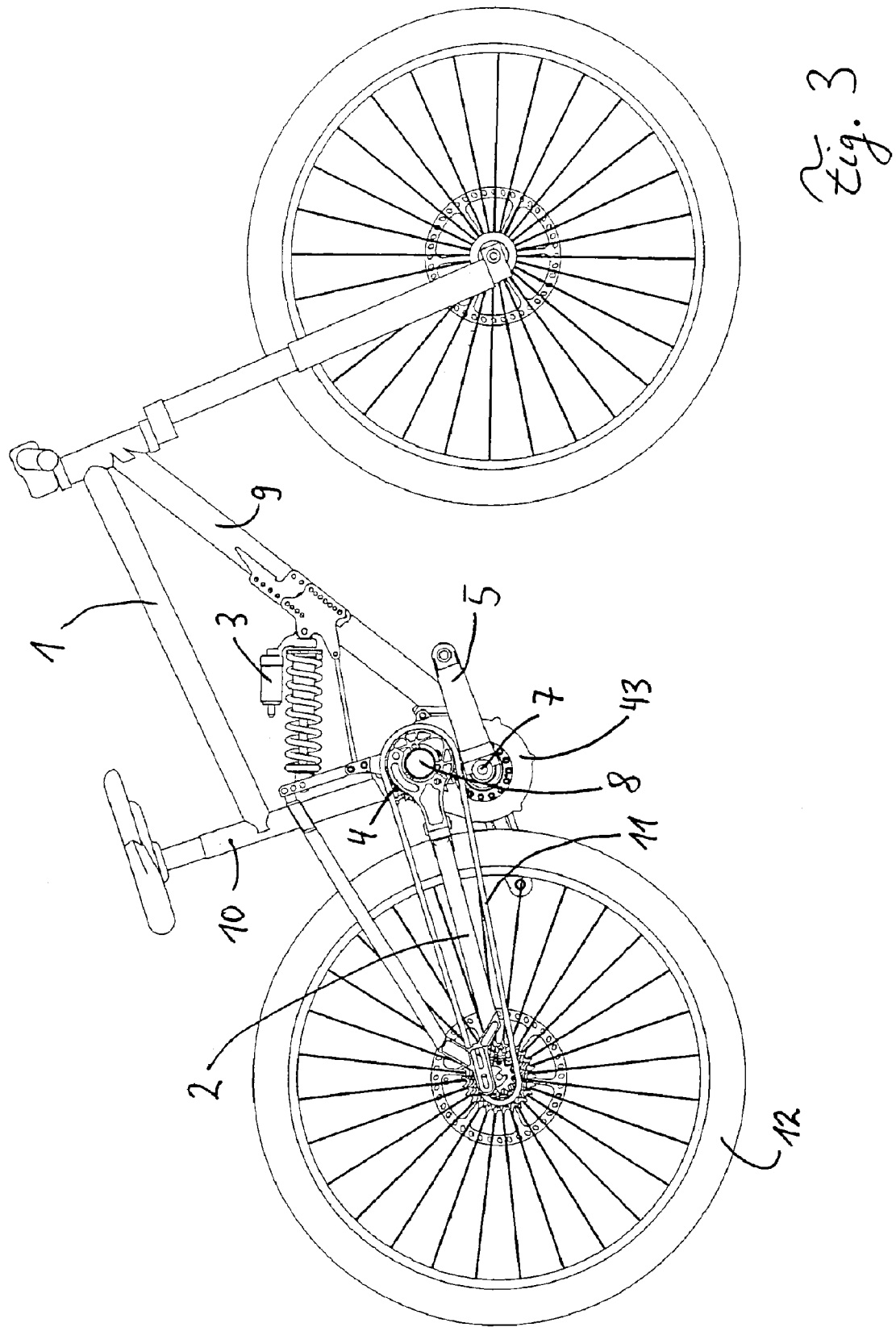
FIG. 3 shows a bicycle in side view and with the belt and chain drive integrated into the frame.

FIG. 3 shows a bicycle in side view, in the frame 1 of which the belt and chain drive according to the invention is arranged inside the gear housing 43 with the cranks 5. The rear wheel link fork 2 is attached to a joint and a shock absorber element 3 on the frame or on the gear housing. The input shaft 7 and the output shaft 8 project out of the gear housing 43. The input shaft 7 is connected to the cranks 5. A driven pinion gear 4 is attached outside the housing part 43 on the output shaft 8, with which pinion gear the rear wheel 12 is driven via the chain 11. The housing part 43 is attached here by way of example between the seat tube 10 and the down tube 9. The rear wheel 12 is supported in the fork end of the link fork 2 in the customary manner.

An exemplary embodiment of the belt and chain drive according to the invention is described in more detail below with the aid of FIGS. 4 through 12. The belt and chain drive 18 according to the invention is accommodated in a multiple-part housing 43, which, as shown in FIGS. 4a and 4b, comprises a right and a left housing cover 13 and 14 and a housing center part 15. Pivot bush receptacles 20 and 19 are arranged in the housing covers 13 and 14, which pivot bush receptacles represent the connection to the rear wheel link fork 2 (not visible). The driven pinion gear assembly 6 is rotatably supported thereon. The two gear mechanisms 16 and 17 are located outside the driven pinion gear assembly 6. The bottom bracket eccentrics 21 and 22 are supported coaxially with the input shaft 7 in the housing parts 13 and 14. The cranks 5 are located to the left and right of the bottom bracket eccentrics 21 and 22, which cranks are attached to the belt and chain drive 18 with a hexagonal receptacle in a torsionally fixed manner and can thus transmit the torque.

FIG. 5 shows the housing mounting of the belt and chain drive according to the invention in detail. Ball bearings 26 are arranged on the input shaft 7, wherein these ball bearings in turn are arranged in the bottom bracket eccentric housing 50 and 51. The pressure rings 27 and 28, which serve as spacers of the ball bearing 26, are located inside the eccentric housing 50 and 51. Moreover, on the left side a retaining ring 37 is located, which secures the ball bearings against lateral slipping. Seals 40 and seal bearing races 39 are attached to the bottom bracket nuts 36 on both sides, which protect the belt and chain drive 18 from environmental influences. The eccentric housing 50, 51 is attached to the housing covers 13 and 14 (not visible) with five screws 29. The axial distance from the input shaft 7 to the output shaft 8 can be varied due to the rotatable attachment of the bottom bracket eccentrics 21 and 22. The driving cranks 5 are attached to the shaft on both sides by a hexagonal receptacle and moreover are fixed by long nuts 35 and a tie rod 24 located in the shaft.

The driven shaft 8 is located inside the belt and chain drive 18 according to the invention and is supported on both sides by annular ball bearings 25 and a bearing pressure ring 55 inside the pivot bush receptacle housing 52 and 53. Five screws 38 attach the two pivot bush receptacles 19 and 20 to the housing covers 13 and 14 (not shown).

Protection from outside environmental influences such as dirt and water, is achieved through a seal 40 and a seal bearing race 39, which are likewise located in the pivot bush receptacle housings 52 and 53. The three multitooth axles 23, only partially visible in FIG. 5a, are located inside the driven shaft 8, which multitooth axles transfer the torque via the pinion flange 31 to the driven pinion gear 4. The connection of driven pinion gear 4 to pinion flange 31 is made by three screws 30. To ensure that the driven shaft 8 is axially fixed in the housing 43, on the left side an end cap 54 attaches the annular ball bearing 25 and the bearing pressure ring 41 to the pivot bush receptacle housing 52 and 53 with the aid of three nuts 32, which are screwed onto the multitooth axles 23 already mentioned.

FIG. 6a and FIG. 6b show the structure of the pulleys 60 and 61 on the drive shaft 7 and driven shaft 8. The bottom bracket shaft 7 is connected in a torsionally fixed manner to the drive pulleys 60 by the spline profile and thus secured against radial displacement. The shoulder rings 59 serve as spacers and secure the axial position of the drive pulleys 60 with respect to the traction means 66 during operation. The driven pulleys 61 are supported on the output shaft 8 congruently to the drive pulleys 60. The traction means assemblies 56 surround the respectively relevant pulleys 60 and 61.

The pulleys 60 and 61 are selected in size and arrangement such that a uniform graduation of the individual gears is possible. The drive pulleys 60 are respectively located on the bottom bracket shaft 7 in the following sequence and number of teeth 34, 31, 41, 38, 40, 45 and 49. The driven pulleys 61 are attached in the following sequence and number of teeth: 34, 27, 31, 25, 23 and 22. These numbers of teeth are selected only by way of example to explain the construction and can likewise be selected differently. Depending on which driven pulley is coupled into the driven shaft by a mechanism yet to be described, a different speed change is obtained between the drive shaft and the driven shaft. In an advantageous embodiment the traction means are embodied as fiber-reinforced toothed belts.

The structure of the drive shaft assembly 65 is shown in FIG. 7a and FIG. 7b. Freewheel teeth 58 are respectively supported between the driven pulleys 61 on the three multitooth axles 23. The movement of the freewheel teeth 58 on the multitooth axle 23 is controlled by the shifting element 87, which is not visible in this figure. Axial splines 96 are inserted in the driven shaft 8 in order to axially secure the inner rings of annular ball bearings 62 and to keep them apart at specific positions of the shaft. The driven shaft 8 has recesses between the inner rings of the ball bearings, in which recesses the freewheel teeth 58 can perform tilting movements. A positive connection between the freewheel teeth and an internal toothing of freewheel bodies 63 can be produced through this tilting movement. These freewheel bodies 63 are connected to the outer rings of the ball bearing 62 and in this manner are rotatably supported on the shaft. The freewheel bodies 63 themselves in turn are rotationally fixed and connected to the driven pulleys 61. In this manner the torque is transferred from the drive shaft 7 in a selectable manner via the different traction means 66 to the driven shaft 8.

The detailed view of the traction means assembly 56 can be seen in FIG. 8a and FIG. 8b. The traction means guide 68, for example, presses the traction means 66 in the direction of the pulleys 60 and 61 with the aid of pressure bearings 69. Valve shims 69 secure the distance from mounting 68 and screws 67 fix the pressure bearings 69 to the traction means guide 68. In an advantageous embodiment the traction means are embodied in their structure such that only one pressure bearing is necessary to press the traction means into the kidney-shaped contour.

The structure of the gear mechanism 16, 17 is explained in more detail in FIG. 9a and FIG. 9b. Two traction casings 86, which are screwed on outside on the gear housing 43 and closed by the traction cover 80, are connected by a cable 76. The shifting element 87 is axially connected in the center to the cable 76 and supported with two radial ball bearings 89 in order to guarantee the rotatability of the shifting element. The cable 76 is guided via the turn pulleys 90 supported on pins 78 inside the driven shaft 8 (not shown) on both sides to the traction coils 72. The traction coils 72 are located supported inside the two traction casings 86. Two further cables 77 and 76 are likewise inserted into the traction casing 86 and are used to actuate the gearshift from the handlebars. Both cables 76 and 77 run in two parallel grooves on the circumference of the traction coil 72 and are attached by a clamping screw 88 or by a cylindrical end body. By rotation of the traction coils in this manner the cables are thus wound up or unwound and an axial movement of the shifting element 87 inside the driven shaft 8, not shown, is produced hereby. To ensure that the shifting element 87 can adopt only specific and reproducible positions inside the driven shaft 8, locking recesses for the locking lever 73 are located on the circumferential surface of the traction coils 72. The leg springs 74 press the radial ball bearing 75 onto the locking lever 73 against the undulatory surface of the traction coil 72. Through the troughs on the traction coil 72, this can adopt a rest position only at certain angular positions. The leg springs 74 are located on a friction bearing 83 on a pin 81. A valve shim 84 secures the distance of the radial ball bearing 75 from the traction cover 80, which is attached to the traction casing 86 with screws 82. It should be noted by way of explanation that the radial ball bearing 70 in the interior of the traction coil 72 renders possible the rotary motion of the coil and a retaining ring 71 secures these bearings against displacement. Since the cable 76 must also be guided through the driven pinion gear assembly 6 (not shown), a hollow special screw 34 is necessary, which is located inside the sealing ring 85 and is attached via a nut 33. Through this overall design, with the aid of the cables 77 the user can thus move the shifting element 87 axially inside the driven shaft 8 (not shown) to seven reproducible positions. If the fact is taken into account that respectively five magnets 79 are also located on three sides on the shifting element 87, the user can adjust seven reproducible magnetic fields inside the driven shaft 8. The shifting element 87 including the magnets 79 arranged thereon is also referred to below as a spool valve 100.

The cutting plane A is shown in FIG. 7b. FIG. 10a represents a section through the driven shaft in this plane A between two pulleys 61. One freewheel body 63 is mounted with internal toothing for each pulley 61. Three freewheel teeth 58 can be seen symmetrically arranged inside the freewheel body 63 and tiltably mounted on the multitooth axles 23. The freewheel teeth 58 are shown in a non-engaged state in this FIG. 10a. The contact surface 13 of the freewheel tooth 58 is located "uncoupled" at a certain distance from the internal toothing of the freewheel body 63. On the faces between driven shaft 8 and freewheel tooth 58, the driven shaft 8 in section bears small holding magnets 92, which ensure that the freewheel teeth always remain in an uncoupled state even in the case of external disturbances (vibrations, etc.). Naturally, the prerequisite for this is that the freewheel tooth 51 is made of a magnetic material. The shifting element 87 is discernible in the center of the figure and shown without cable 76. The rectangular magnets 79 are likewise located symmetrically to the center point inside the shifting element 87. The magnetic field thereof pushes the three freewheel magnets 91 outwards in this configuration. Since the freewheel magnets 91 are firmly embedded in the freewheel teeth 58, the tilting movement of the three freewheel teeth 58 is actuated in this manner. The multitooth axles are preferably made of steel and transmit the torque directly up to the driven pinion gear assembly 6. Excessive material tensions are thus kept away from the driven shaft. The negative polarity of the freewheel magnets 91 and the magnets 79 on both sides is shown by a minus sign inside FIG. 10a. This state from FIG. 10a can thus be referred to as "magnetically disengaged."

FIG. 10b likewise shows a section through the driven shaft in the plane A between two pulleys 61. Here too, the three freewheel teeth 58 can be seen arranged symmetrically inside the freewheel body 63 and tiltably mounted on the multitooth axles 23. However, in this FIG. 10b the freewheel teeth 58 are shown in an engaged state. The contact surface B of the freewheel tooth 58 is located in a "coupled" manner in positive connection with the internal toothing of the freewheel body 63. The holding magnets 92 arranged inside the driven shaft 8 do not touch the freewheel teeth in this position. The shifting element 87 is discernible in the center of the figure and is shown without cable 76. The rectangular magnets 79 are likewise located symmetrically to the center point inside the shifting element 87. The magnetic field thereof draws the three freewheel magnets 91 inwards in this configuration. Since the freewheel magnets 91 are firmly embedded in the freewheel teeth 58, the tilting movement of the three freewheel teeth 58 is actuated in this manner. The internal toothing of the freewheel body 63 is designed such that the freewheel teeth can only transmit a torque if the pulley 61 is rotating in a clockwise direction. With a counter-clockwise rotation, the structure operates as a freewheel mechanism. The fact that the magnets mutually attract one another, is shown in FIG. 10b by a plus sign and a minus sign. This state from FIG. 10b can thus be referred to as "magnetically engaged."

FIG. 10c likewise represents a section through the driven shaft in the plane A between two pulleys 61. Here too, the three freewheel teeth 58 are discernible arranged symmetrically inside the freewheel body 63 and tiltably mounted on the multitooth axles 23. However, the freewheel teeth 58 in this FIG. 10c, as in FIG. 10a, are shown in a disengaged state. The contact surface 13 of the freewheel tooth 58 is located "uncoupled" at a distance from the interior toothing of the freewheel body 63. The holding magnets 92 arranged inside the driven shaft 8 touch the freewheel teeth 58, which are made of steel and thus magnetic, and hold them firmly in position. The shifting element is not located under the freewheel teeth 58 here, but axially displaced inside another pulley. This state from FIG. 10c can thus be referred to as "freely disengaged." It should be noted by way of explanation that these coupling means in principle can be arranged on any shaft of a transmission. The coupling means is shown here on the output shaft by way of example.

Figure 11A:
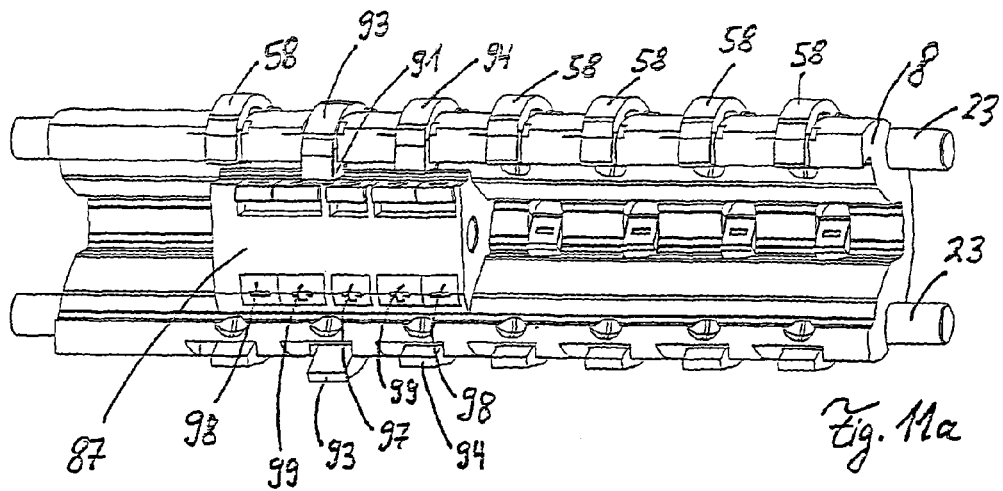
FIG. 11a shows a position of the freewheel teeth —disengaged.
Figure 11B:
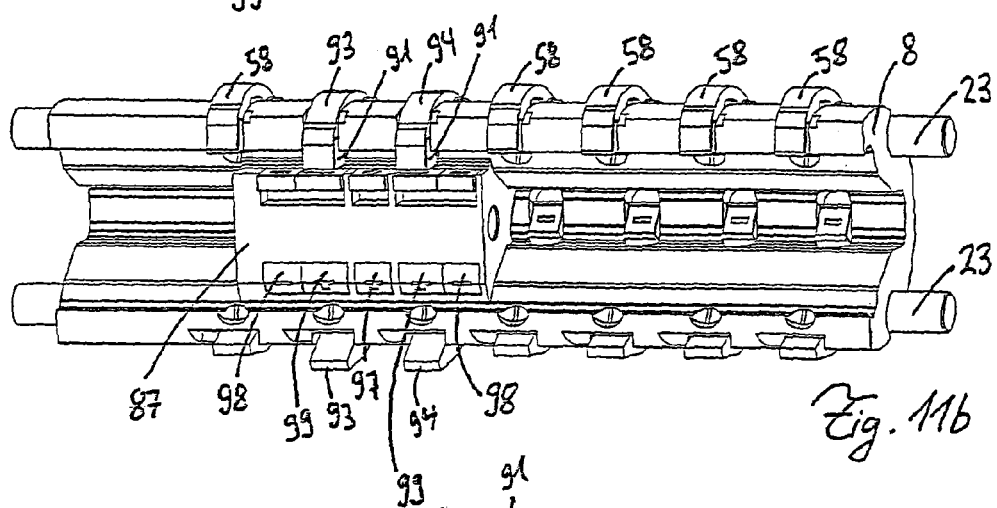
FIG. 11b shows a position of the freewheel teeth —engaged.
Figure 11C:
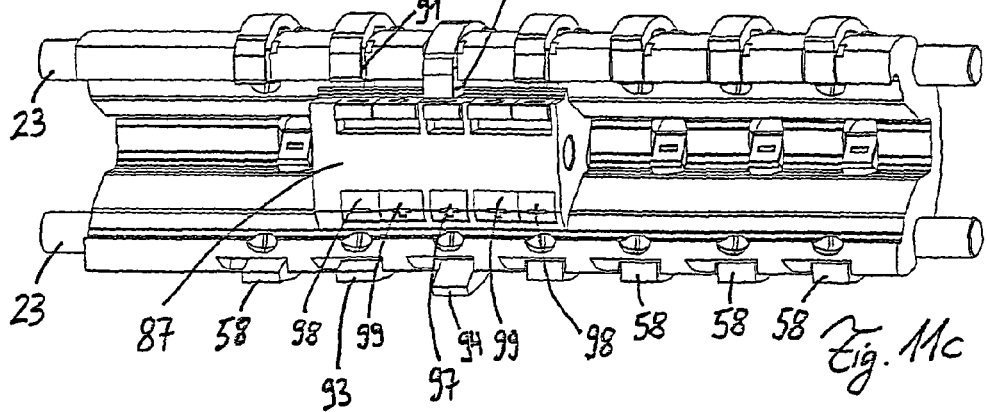
FIG. 11c shows a position of the freewheel teeth —starting position.

The shifting operation is shown in detail by way of example in FIGS. 11a, 11b and 11c. FIG. 11a shows the driven shaft 8 with the 7 coupling means in longitudinal section without the freewheel body 63 and without the pulleys 61. The gear mechanism already described in FIG. 9 is restricted to the representation of the shifting element 87, in which the magnets 79 are inserted. The polarity of the magnets is shown by a plus and a minus sign. Two of three multitooth axles 23 are also discernible, which are often also referred to below as steel axles. The freewheel teeth 58 can perform tilting movements on these multitooth axles 23. In general, inside here at least one component is supported rotatably or displaceably relative to a toothing.

The center magnet 97 is located with its positive side aligned to the freewheel tooth firmly inserted into the shifting element 87. The shifting element 87 is located in the image exactly in the center below the engaged freewheel tooth 93. The freewheel magnet 91 is aligned with its negative pole to the shifting element 97 and is thus attracted. Through the rocker shape of the freewheel teeth, the contact surface B from the image in FIG. 10a is pressed into the interior toothing of the freewheel body (not shown). In this manner a rotationally fixed connection is produced between the input shaft and the output shaft through this positive coupling means. Or to put it in general terms, inside the coupling means at least one component can adopt a positive position in a toothing. Magnets 98 are likewise inserted on both outer edges of the shifting element 87, which magnets, however, are aligned with their negative side in the direction of the freewheel teeth 93. Through this alignment the freewheel magnet 91 is pushed away with its negative pole from the shifting element 97 and in this manner is actively uncoupled. The so-called intersecting magnets 99 are located directly next to the negatively polarized magnets 98, which intersecting magnets are inserted firmly into the shifting element 87 with their positive side aligned to the freewheel tooth. The intersecting magnets 99 in this FIG. 11a do not have any influence on the freewheel teeth 58, 93 and 94. In this FIG. 11a, the second gear is therefore engaged from the left. In addition, it should be noted that the shifting element in this FIG. 11a is located at a click-stop position and therefore the second gear is in a locked-in state.

FIG. 11b shows the shifting operation from this gear two into gear three. If the third freewheel tooth 94 is observed from the left side, the engagement operation of gear three is synonymous with the tilting movement of this freewheel tooth 94. Likewise in FIG. 11*b* the shifting element 87 can be seen during its movement to the right. As soon as the shifting element 87 has covered a certain stretch, the intersecting magnets 99 already effect the engagement operation of the freewheel tooth 94. In this situation, however, the freewheel tooth 93 is still engaged. Since both freewheel teeth cannot transmit forces due to the different speed changes inside the individual gears, at this moment one of the two freewheel teeth 93 and 94 operates in its freewheel function and jumps into the internal toothing in a manner imperceptible to the user. However, at this point it is important to emphasize that the transmission for this reason is not able to adopt an idle position. In addition, it should be noted that the shifting element in this FIG. 11*b* is not located at a click-stop position and is forced by the mechanism described in FIG. 9 to adopt the position shown in FIG. 11*c*.

FIG. 11*c* shows the completed shifting operation from gear two into gear three. If the second freewheel tooth 93 is observed from the left side, it has been pressed out of the form closure of the freewheel body by the negatively polarized magnet on the shifting element. In general terms, here inside the coupling means at least one component can adopt a position at a distance relative to a toothing. In FIG. 11*c* the shifting element 87 is likewise discernible again precisely in the center in its click-stop position under the third freewheel tooth 94. The shifting process is thus completed. It is hereby shown by way of example with this 7-gear multiple-gear transmission that a shifting capacity under load as well as a shifting capacity at a standstill can be achieved through the invention. It is likewise clear that it is also impossible to accidentally engage an idle position. FIG. 11 thus shows by way of example that the invention is in addition advantageously characterized in that at least one component adopts a position at a distance relative to a toothing after two identically polarized magnetic fields have moved towards one another.

Figure 12A:
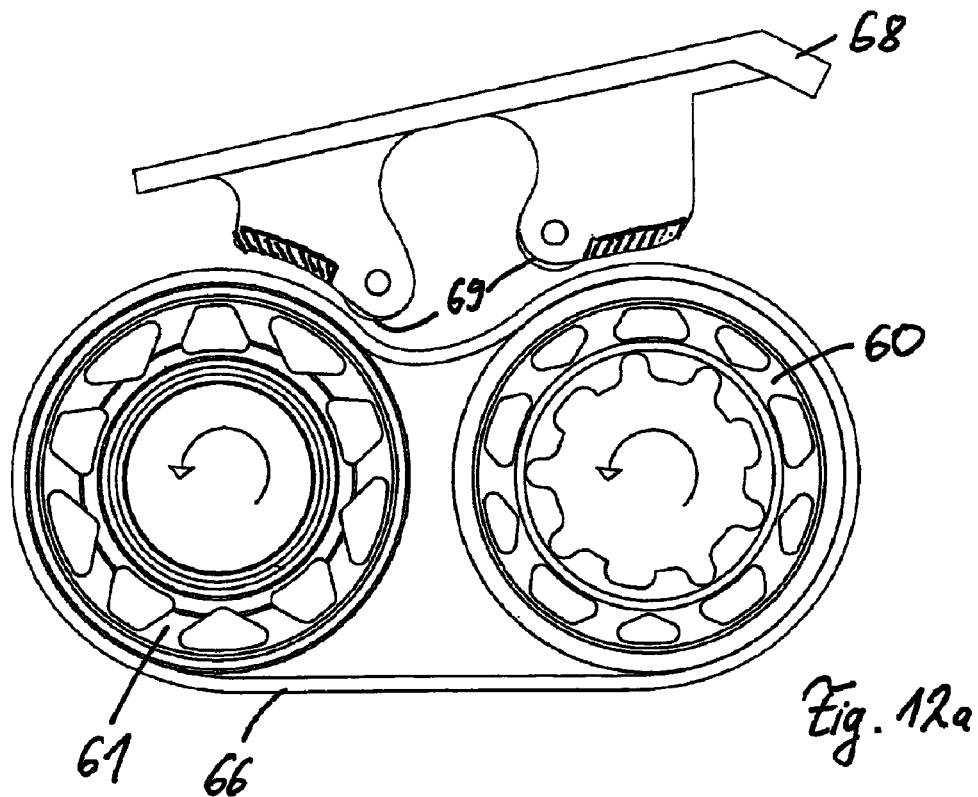
FIG. 12a shows a view of the transmission under load.

FIG. 12 shows a gear transmission with a traction means 66 and a pulley 60 for the drive and a pulley 61 for the output. Preferably the traction means 66 is embodied as a toothed belt and the pulleys 60 and 61 are embodied as belt pulleys. However, this fact is not shown in the figure. FIG. 12*a* shows the gear transmission in the loaded state.

Figure 12B:
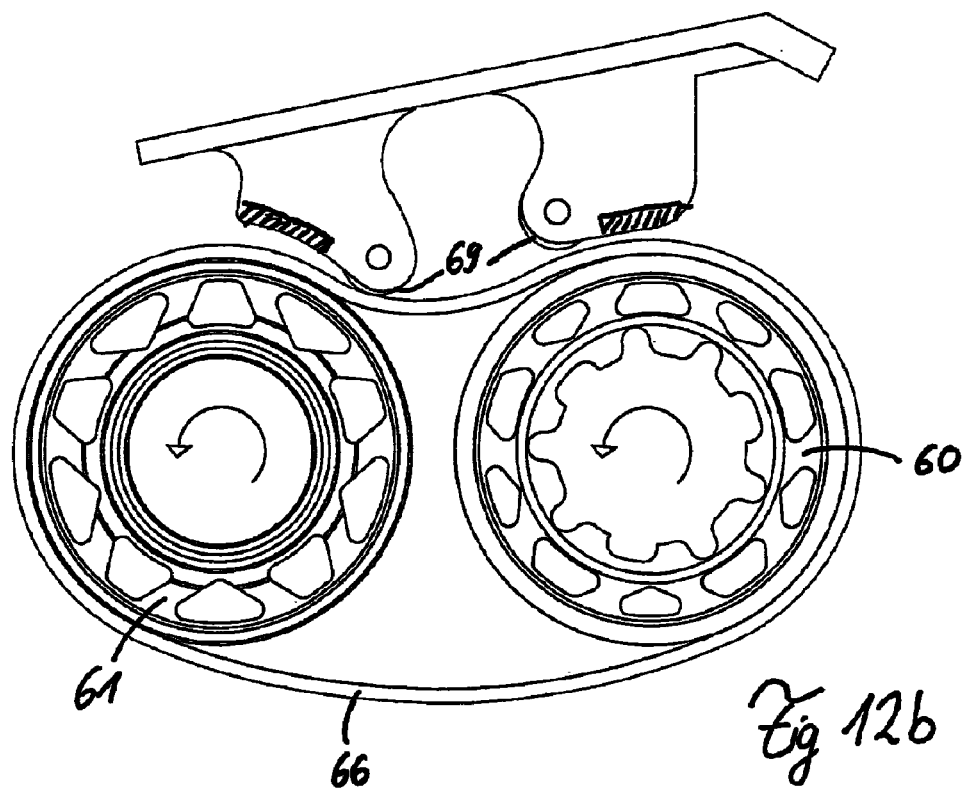
FIG. 12b shows a view of the transmission load-free.

It is discernible that the pressure bearings 9 in this load state do not touch the traction means. This prevents the toothed belt from jumping to the belt pulleys, since an increase in the load leads to an increase in the chain wrap-around and also to a more concave curvature of the slack side. However, without load, the toothed belt, as shown in FIG. 12*b*, tries to form a convex shape in the driving side and in the slack side due to its internal stress. However, this is prevented in the slack side by the pressure bearing.

In general terms, the traction means is thus pressed into a kidney-like shape by at least one component during no-load rotation. On the driving side, the belt reaches its convex form, as is clearly visible in FIG. 12*b*.

The toothed belt is thus advantageously prevented from jumping onto the belt pulleys in that the kidney-like shape of the traction means under load is formed by a straight shape of the driving side and through a more convex curvature of the slack side. When load impacts and disturbance variables from outside act on the transmission, this can lead to the toothed belt lifting from the belt pulleys. In FIGS. 12*a* and 12*b* areas are shown by hatching which on the slack side form additional guides in a contactless manner in the immediate vicinity of the toothed belts and are shaped in a similar manner to the outer contour of the toothed belt. These guides prevent the toothed belts from completely leaving the belt pulleys and thus prevent damage to the belt through squeezing effects between the pressure roller and belt pulley.

The invention claimed is:

1. A traction belt and chain drive transmission for vehicles or for use in drive technology with an input shaft and an output shaft supported on a frame, the input shaft and the output shaft projecting out of the frame, comprising:
    gear transmissions with gear wheels, which are embodied as belt and chain drives, located between the input shaft and the output shaft,
    all of the gear wheels are constantly in rotation during operation,
    the gear transmissions located between the input shaft and the output shaft are embodied as belt and chain drives with toothed belts as traction mechanisms and with pulleys as gear wheels,
    the traction mechanisms are reinforced with aramide, Kevlar, carbon fibers or other fibrous materials,
    wherein:
    the traction mechanisms are pressed into a kidney-like shape onto the pulleys by at least one component during no-load rotation, and that under the effect of load the at least one component does not touch the traction mechanisms, and
    the kidney-like shape of the traction mechanisms during no-load rotation is formed by a convex curvature of a driving side and by a concave curvature of a slack side, and
    the kidney-like shape of the traction mechanisms under load is formed by a straight shape of the driving side and by a concave curvature of the slack side, and
    the at least one component includes a traction guide with plural pressure bearings which press against the traction mechanism.

2. The transmission according to claim 1, wherein the gear wheels are located on the input shaft or the output shaft in a rotatably mounted manner, the gear wheels can be connected to the shaft in a rotatably fixed manner.

3. The transmission according to claim 2, wherein inside a coupling mechanism at least one component is supported relative to a toothing in a rotatable or displaceable manner.

4. The transmission according to claim 3, wherein the inside the coupling mechanism at least one component in a toothing can adopt a positive position.

5. The transmission according to claim 3, wherein inside the coupling mechanism at least one component can adopt a position at a distance relative to a toothing.

6. The transmission according to claim 3, wherein at least one mechanism adopts a position at a distance relative to a toothing after two identically polarized magnetic fields have moved towards one another.

7. The transmission according to claim 3, wherein a positive coupling mechanism is formed by freewheel teeth that can engage in a toothing.

8. The transmission according to claim 7, wherein the toothing is embodied as an internal toothing.

9. The transmission according to claim 7, wherein the freewheel teeth are arranged symmetrically to the toothing.

10. The transmission according to claim 7, wherein the freewheel teeth are tiltably mounted on steel axes inside the output shaft on which the coupling mechanism is located.

11. The transmission according to claim 10, wherein a tilted position of the freewheel tooth on the steel axes is held by a permanent magnet.

12. The transmission according to claim 11, wherein the permanent magnet is inserted into a shaft on which the coupling mechanism is located.

13. The transmission according to claim 3, wherein the coupling mechanism is formed by joining a permanent magnet and a steel component.

14. The transmission according to claim 2, wherein the positive rotationally fixed connection between shaft and gear wheel can be neutralized with aid of energy that was stored prior to the decoupling in a magnetic field.

15. The transmission according to claim 1, wherein at least one component inside the coupling mechanism has the properties of a permanent magnet with a magnetic north pole and south pole.

16. The transmission according to claim 1, wherein a state of the a coupling mechanism changes through a change of an additional magnetic field inside or in an immediate vicinity of the coupling mechanism.

17. The transmission according to claim 16, wherein a change of the additional magnetic field is achieved by axial displacement of permanent magnets along the rotational axis of a shaft on which the coupling mechanism is located.

18. The transmission according to claim 17, wherein an axial displacement of permanent magnets is carried out inside a hollow driven shaft.

19. The transmission according to claim 17, wherein the axial displacement of permanent magnets is carried out outside the input shaft.

20. The transmission according to claim 17, wherein the permanent magnets that are axially displaced are inserted into a spool valve component.

21. The transmission according to claim 20, wherein the permanent magnets are inserted into the spool valve component with different polarity.

22. The transmission according to claim 20, wherein a bearing is located inside the spool valve component.

23. The transmission according to claim 20, wherein the spool valve component is connected to a traction mechanism for the axial movement.

24. The transmission according to claim 20, wherein the spool valve component adopts click-stop positions within its axial movement with respect to the shaft.

25. The transmission according to claim 16, wherein the change of the additional magnetic field is carried out inside or in the immediate vicinity of the coupling mechanism by electromagnets.

26. The transmission according to claim 1, wherein during at least one shifting operation a state of at least two coupling mechanisms changes simultaneously.

27. The transmission according to claim 1, wherein at least one coupling mechanism can transmit only torques in one direction of rotation.

28. The transmission according to claim 1, wherein the frame of the gear transmissions is embodied as a closed housing.

29. The transmission according to claim 1, wherein the fibrous materials are covered with polyurethane.

30. The transmission according to claim 1, wherein the traction mechanisms change their belt tension during the shifting operation.

31. The transmission according to claim 1, wherein the traction mechanisms change their chain wraparound on the belt wheel during the shifting operation.

32. The transmission according to claim 1, wherein the at least one component that presses the traction mechanisms into a kidney-shaped form is embodied as a roller.

33. The transmission according to claim 1, wherein additional guides are located on the slack side in a contactless manner in an immediate vicinity of the toothed belts, which guides are shaped in a similar manner to the outer contour of the toothed belts.

34. A traction drive transmission for use in drive technology, with an input shaft and output shaft mounted on a frame, the input shaft and output shaft being guided out of the frame, comprising:
   a gear transmission-situated between the input shaft and output shaft with gear wheels designed as a belt drive,
   all gear wheels are continuously in rotation during operation,
   the gear transmission-situated between the input shaft and output shaft is designed as a belt drive with a synchronous belt as a traction mechanism and with pulleys as gear wheels, wherein
   the traction mechanism during load-free rotation is forced onto the pulley wheels by at least one a substantially kidney shape component, and that, under the influence of a load, the substantially kidney shape component is separated from the traction mechanism, and
   the substantially kidney shape component of the traction mechanism during load-free rotation is formed by a convex arch of a strand side and by a concave arch of a slack side, and
   the substantially kidney shape component of the traction mechanism under load is formed by a straight form of the strand side and a reinforced concave arch of the slack side, and
   the substantially kidney shape component includes a traction guide with plural pressure bearings.

35. The transmission according to claim 34, wherein the gear wheels are located on the input shaft or the output shaft in a rotatably mounted manner, the gear wheels can be connected to the shaft in a rotatably fixed manner.

36. The transmission according to claim 35, wherein inside a coupling mechanism at least one component is supported relative to a toothing in a rotatable or displaceable manner.

37. The transmission according to claim 36, wherein the inside the coupling mechanism at least one component in the toothing can adopt a positive position.

38. The transmission according to claim 36, wherein inside the coupling mechanism at least one component can adopt a position at a distance relative to the toothing.

39. The transmission according to claim 34, wherein the frame of the gear transmission is embodied as a closed housing.

40. The transmission according to claim 34, wherein the traction mechanisms change their belt tension during shifting operation.

41. The transmission according to claim 34, wherein the traction mechanisms change their chain wraparound on the belt wheel during shifting operation.

42. The transmission according to claim 34, wherein the at least one component that presses the traction mechanism into a kidney-shaped form is embodied as a roller.

43. The transmission according to claim 34, wherein additional guides are located on a slack side in a contactless manner in an immediate vicinity of the toothed belts, the guides are shaped in a similar manner to an outer contour of the toothed belts.

44. The transmission according to claim 34, wherein the traction mechanism is reinforced with aramid, Kevlar, carbon fibers or other fiber materials.

45. The transmission according to claim 44, wherein the fibrous materials are covered with polyurethane.

* * * * *